United States Patent [19]
Alcorn

[11] Patent Number: 5,933,144
[45] Date of Patent: Aug. 3, 1999

[54] UTILITY FOR PROVIDING PRINTING SUPPORT TO GRAPHICAL JAVA APPLICATIONS

[75] Inventor: John William Alcorn, Austin, Tex.

[73] Assignee: International Business Machines Corporation, Armonk, N.Y.

[21] Appl. No.: 08/976,018

[22] Filed: Nov. 12, 1997

[51] Int. Cl.⁶ .................................................. G06F 15/16
[52] U.S. Cl. .................. 345/347; 395/200.33; 395/682; 395/114
[58] Field of Search .............................. 395/200.33, 682, 395/683, 114; 345/335, 339

[56] References Cited

U.S. PATENT DOCUMENTS

| | | | |
|---|---|---|---|
| 5,572,643 | 11/1996 | Judson | 395/793 |
| 5,768,510 | 6/1998 | Gish | 395/200.33 |
| 5,848,246 | 12/1998 | Gish | 395/200.58 |
| 5,870,719 | 2/1999 | Maritzen et al. | 705/26 |

*Primary Examiner*—Mark K. Zimmerman
*Assistant Examiner*—David E. Brown
*Attorney, Agent, or Firm*—David A. Mims, Jr.; Daniel E. Venglarik; Andrew J. Dillon

[57] ABSTRACT

Print support may be added to a software component forming part of an existing application by checking the component to determine if it belongs to a class for which print support was originally available. The component may belong to a class having print support available but fail to specifically address print support in its coded methods, or it may belong to a class for which print support was not intrinsically available. If the component belongs to the requisite class, print support may be wired in by simple adding a "dip" component to the subject components' notification methods. The "dip" component provides the necessary dialogs and interfaces to the available print support. If the component is not dippable, or capable of keeping track of dip components, it may be morphed into a dippable component by instantiating a subclass component having the same properties, events, and methods as the undippable component as well as code for keeping track of a dip component.

20 Claims, 9 Drawing Sheets

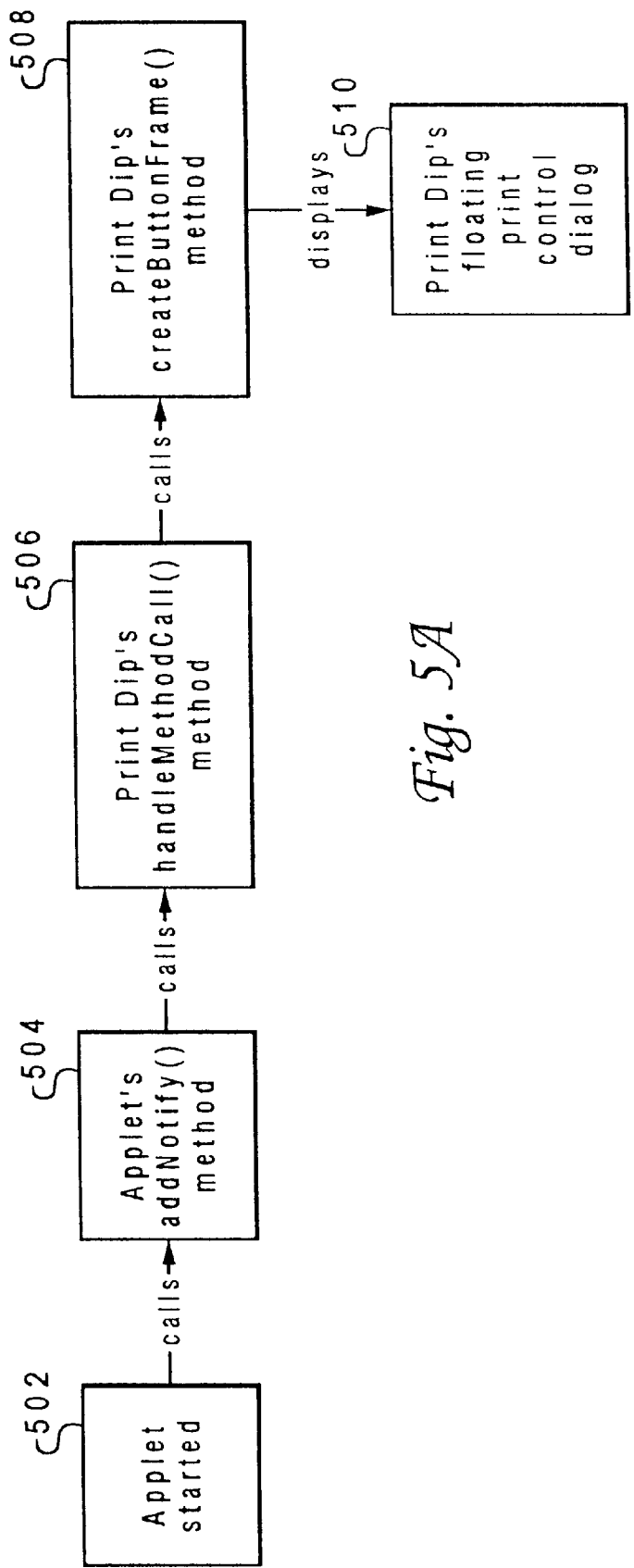

UTILITY FOR PROVIDING PRINTING SUPPORT TO GRAPHICAL JAVA APPLICATIONS

BACKGROUND OF THE INVENTION

1. Technical Field

The present invention relates in general to component software architectures and in particular to Java and Java Beans components. Still more particularly, the present invention relates to providing print support for Java Beans.

2. Description of the Related Art

Component software architectures and rapid application development (RAD) tools are increasingly proliferating. Component software architectures employ discrete software components to quickly prototype and flesh out interactive applications. Applications are built by combining a set of independent components with developer-written code which acts as a "glue" between components, usually responding directly to component events by setting component properties or invoking component methods. One currently popular component software architecture is the Java Bean specification of the Java programming language.

Developed by Sun Microsystems, the portability, security, and intrinsic distributed programming support features of the Java programming language make this language useful for Internet programming. Java is a totally object-oriented, platform independent programming language, which achieves architectural independence by compiling source code into its own intermediate representation. Java source code is not complied into normal machine code, but is translated into code for a virtual machine specifically designed to support Java's features. A Java interpreter or a Java-enabled browser then executes the translated code. While Java source code must be compiled, no link step is required since the Java interpreter dynamically links the translated code at run time.

Java Beans is a component model for building and using Java-based software components. A "bean" is simply a Java class with extra descriptive information, similar to the concept of an object linking and embedding (OLE) type library. Unlike an OLE library, however, a bean is usually self-describing, including a file which contains the class's symbol information and method signatures and which may be scanned by a development tool to gather information about the bean. Any Java class with public methods may be considered a bean, but a bean typically has properties and events as well as methods.

Java is well-suited for implementation in graphical user environments or object-oriented interfaces. The Java abstract window toolkit (AWT) allows graphical user interface (GUI) objects to be treated in a generic manner without regard to the system on which the program is running. Combined with the feature of platform-independence, this feature promotes faster development of Internet and cross-platform software using Java.

Java programs are usually classified as either applications, which are run on a Java interpreter, or applets, which are run by a Java-enabled browser. Most Java applications and applets do not provide support for printing, but are generally designed to simply display their output to a screen. Applets are typically designed, for example, to generate output which is simply displayed by a Web browser. The reason is that Java, until the recent release of Java Development Kit (JDK) version 1.1, did not provide built-in support for printing. Even applications and applets written for JDK 1.1 may not explicitly address the issue of printing or generating output in forms other than simple display, and thus may not provide satisfactory output support.

When working with a Java application or applet, a user may wish to generate printouts of their work, only to discover that the Java application or applet does not offer printing support. Similarly, a user wishing to fax their work, or generate some other form of output based on their work, will usually discover that such forms of output are not supported by the Java application or applet. The only means presently available for printing the output of a Java application or applet which does not support printing is to invoke "Print Screen," which is not available on all platforms and/or configurations.

An additional consideration arises from the fact that one of the main goals of component software architectures, such as Java Beans, is to permit building of applications or applets by "wiring" together several components (beans) in an application builder environment to produce custom applications tailored to meet particular needs. However, applications built in such a manner often do not address the issue of printing. Generally, such applications are limited to the capabilities provided by the components utilized in assembling the application. The constituent components typically address a narrow, specific function, such as displaying a graph or chart, and do not attempt to address complex issues such as printing.

It would be desirable, therefore, to provide print support to preexisting software components (such as Java beans) which do not specifically address printing. It would be advantageous if the print support could be easily added to software components by wiring in the print support using an application builder environment. It would further be advantageous if the print support were implemented in a platform-independent manner, utilizing the standard print dialog of an ambient operating system.

SUMMARY OF THE INVENTION

It is therefore one object of the present invention to provide an improved method of utilizing a component software architecture.

It is another object of the present invention to provide an improved method of utilizing Java and Java Beans components.

It is yet another object of the present invention to provide a mechanism and apparatus for providing print support for Java Beans.

The foregoing objects are achieved as is now described. Print support may be added to a software component forming part of an existing application by checking the component to determine if it belongs to a class for which print support was originally available. The component may belong to a class having print support available but fail to specifically address print support in its coded methods, or it may belong to a class for which print support was not intrinsically available. If the component belongs to the requisite class, print support may be wired in by simple adding a "dip" component to the subject components' notification methods. The "dip" component provides the necessary dialogs and interfaces to the available print support. If the component is not dippable, or capable of keeping track of dip components, it may be morphed into a dippable component by instantiating a subclass component having the same properties, events, and methods as the undippable component as well as code for keeping track of a dip component.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 5A–5C depicts block diagrams of code interactions occurring during execution of a dipped Java bean in accordance with a preferred embodiment of the present invention.

DETAILED DESCRIPTION OF THE PREFERRED EMBODIMENT

Figure 1:
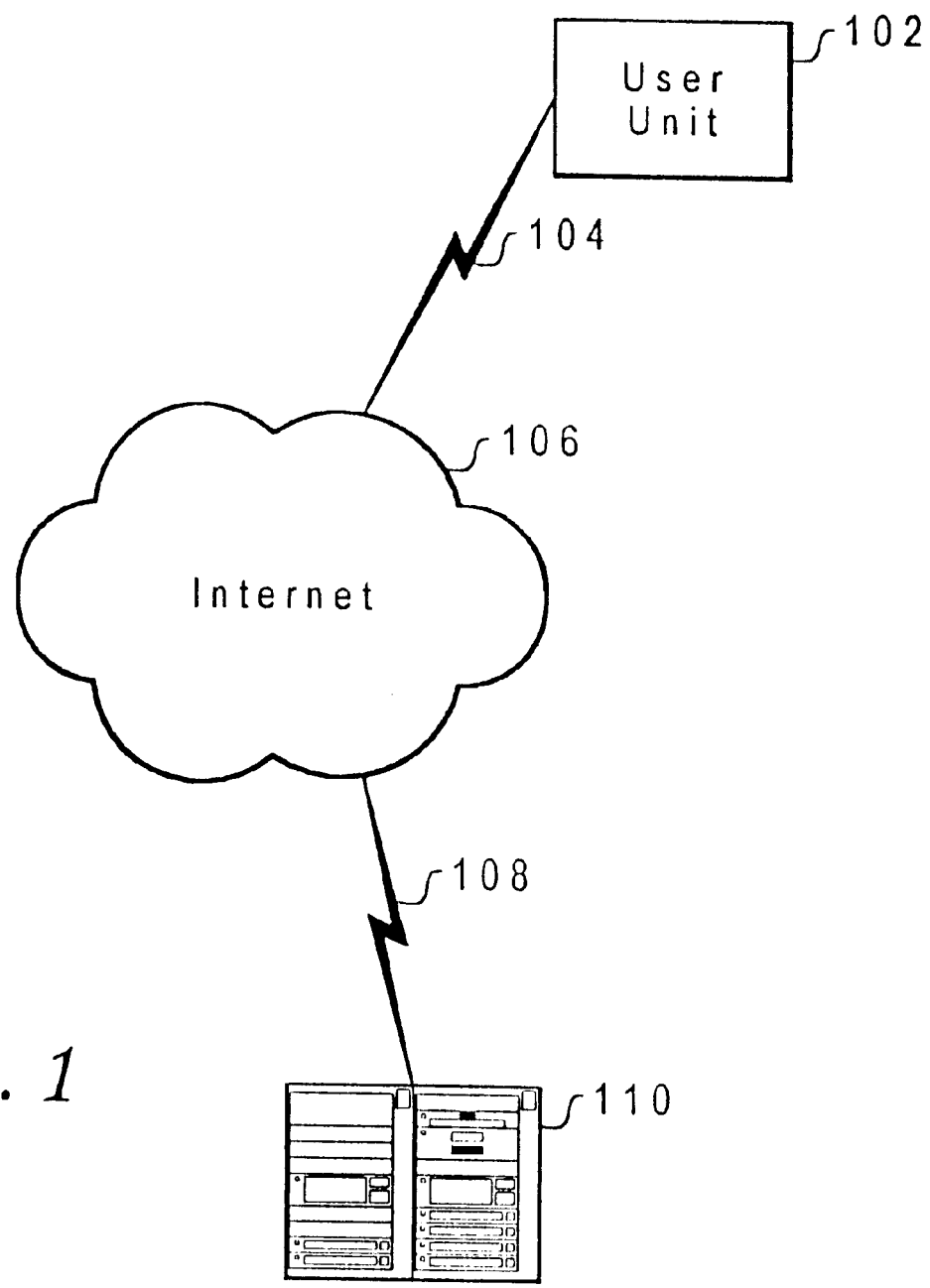
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The exemplary embodiment depicted includes a client 102 connected via communications link 104 to the Internet 106. Communications link 104 may, for example, be in the form of access provided by an Internet service provider (ISP). Client 102 includes a Java-enabled browser application, allowing client 102 to retrieve and display information formatted in accordance with the HyperText Markup Language (HTML) and to run Java applets.

Also connected to Internet 106, via communications link 108, is server 110. Server 110 is a World Wide Web (WWW, often simply referred to as "the Web") server capable of receiving and serving HyperText Transmission Protocol (HTTP) requests. Client 102 may retrieve HTML-formatted data from server 110 and display such information, executing Java applets in connection with such retrieval and/or display. Java applets thus executed may be provided with print support in accordance with a preferred embodiment of the present invention. Beans for Java applets may be provided with such print support utilizing the invention as described below.

Figure 2:
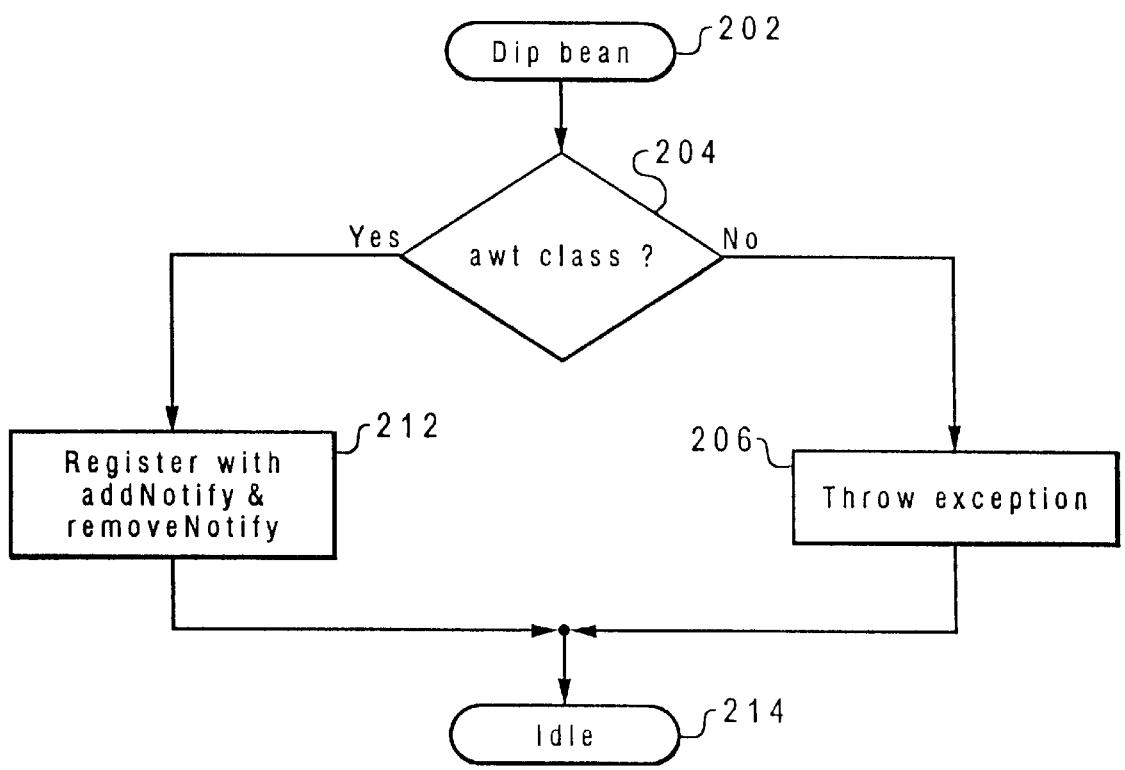
FIG. 2 is a high level flowchart for a process of providing a Java bean with print support in accordance with a preferred embodiment of the present invention.

Referring to FIG. 2, a high level flowchart for a process of providing a Java bean with print support in accordance with a preferred embodiment of the present invention is illustrated. The process begins at step 202, which illustrated "dipping" the bean. "Dipping" a Java bean involves instantiating a "dip" object—a software component designed to support or extend the functionality of a Java bean—for the Java bean being dipped, and providing the requisite associations of methods, properties, events, etc. between the dip and bean components to enable the desired functional interaction. In graphical Java development tools, the user interface may be designed to produce this effect in response to dragging and dropping an iconic representation of the bean onto an icon for the dip. A "dip" such as the PrintDip of the present invention, when applied to a dippable bean, is able to register to be notified whenever any method is invoked, property is changed, or event is fired from the dippable bean to which the dip is applied. A dip may also veto an action in progress, keeping the method from being invoked, the property from being changed, or the event from firing. Upon receiving the notification described, the dip may execute whatever code it desires. The present invention relates to dippable beans. If a bean is not dippable, or capable of having dips applied to it, it may be morphed into a dippable bean by introspecting the bean (using standard Java introspection capabilities) to determine its properties, methods, and events and then instantiating a subclass of the bean which retains all of the functionality or the original bean plus the code for keeping track of dips and allowing dips to listen for properties, methods and events. The process of introspection is well known in the art, such that morphing a bean to make it dippable may be provided as a user option. Implementations of the present invention may provide an error message advising the user to morph the bean by manually selecting a morph option in the application environment.

Figure 3:
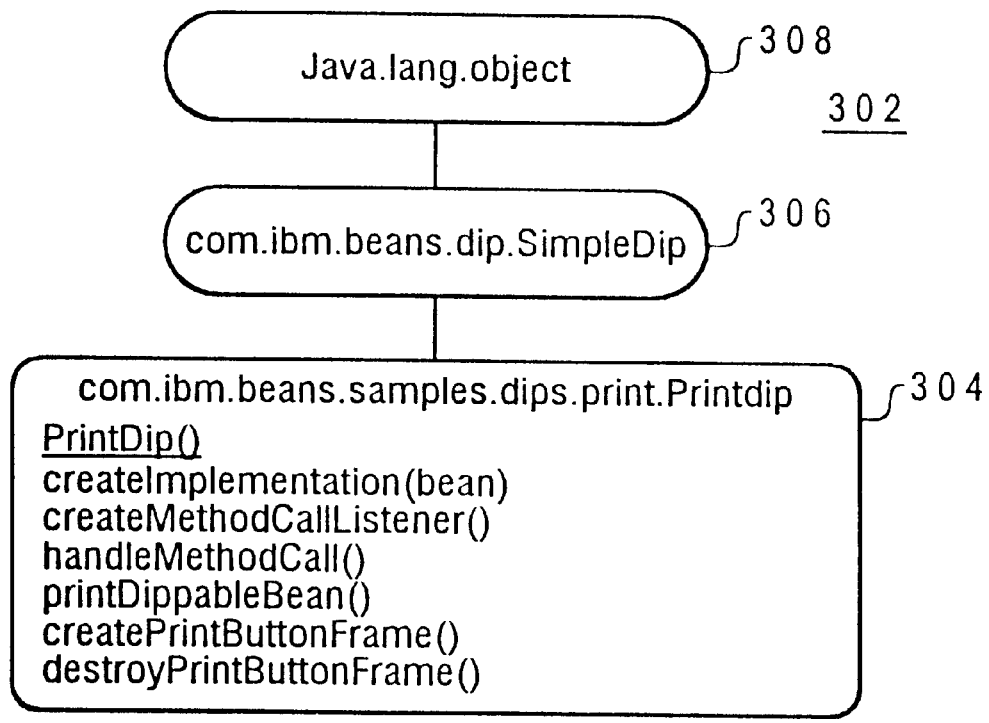
FIG. 3 depicts a class diagram for a print dip component in accordance with a preferred embodiment of the present invention.

Turning for a moment to FIG. 3, a class diagram for a print dip component in accordance with a preferred embodiment of the present invention is depicted. The class hierarchy 302 for a print dip component includes a PrintDip class 304, which implements DipMethodCallListener and Serializable interfaces for the dipped component. PrintDip class 304 has a SimpleDip parent class 306, which implements the dip interface for the dipped component. SimpleDip class 306 has a Object parent class 308, which is the superclass of all Java objects. PrintDip class 304 includes the constructor PrintDip( ), which instantiates new print dip components with default values for each property. An instance of class PrintDip 304 includes the methods createImplementation (bean), which checks the object to which the dip is being applied to ensure the object is a descendent of java.awt .Component (a member of the AWT class) and createMethodCallListener( ), which wires the dip to be notified when either of the addNotify and removeNotify methods of the dippable bean are called. The addNotify and removeNotify methods are basically notifications that a component receives when added to or removed from a container. A component's addNotify method will be invoked as part of the process of creating and displaying. Similarly, a component's removeNotify method will be invoked as part of the process of hiding and destroying a component. The PrintDip of the present invention registers to receive these notifications from the dippable bean to which it is applied in order to determine when it should show or hide the floating "Print" dialog.

Referring once again to step 202 depicted in FIG. 2, the process next passes to step 204, which illustrates a determination of whether the Java bean being dipped is a member of the Java abstract windowing toolkit (AWT) class of the application environment, which allows graphical user interface (GUI) objects to be treated in a generic manner without regard to the system on which the program is running. This determination may be made, for example, by determining whether the bean has the class java.awt.Component as an ancestor. The exemplary embodiment of the present invention employs the AWT application programming interfaces (API's) to provide print support to Java beans without requiring platform-dependent native calls. Thus, in a relatively small amount of 100% pure Java code, the present invention provides additional functionality which is quite useful to preexisting beans, and provides the additional functionality in a simple and straightforward manner. A handleMethodCall method, which is a method from the DipMethodCallListener interface, may be implemented and called to allow the dip to respond to method calls on the dippable bean to which the dip is applied (providing notice, for example, that the addNotify or removeNotify method has been invoked).

The AWT implements printing by enabling device-independent drawing, much in the same manner as Open-Doc. The AWT employs PrintGraphics, a subclass of Graphics associated with a print job which may be passed in as the Graphics parameter of the paint( ) method of the AWT component. The code inside the paint( ) method of an AWT component is generally intended to simply draw to a screen, but also works when drawing to a Graphics subclass such as PrintGraphics. Thus, a standard print dialog for the ambient operating system may be presented by the AWT component, the results of which are utilized in constructing a PrintGraphics subclass. This PrintGraphics subclass may form the basis for supporting printing in a hierarchy of AWT components which comprise dippable beans, causing the beans to be rendered. A PrintGraphics subclass may be associated with a printer, plotter, fax modem, or anything else which may be communicated with through a "printer driver" (anything that can present itself as an output option in a standard Print dialog), including outputs to files in various formats (e.g., PostScript). The standard controls available to AWT developers (such as push-buttons, scroll bars, Frame, Dialog, Menu, etc.) are, as AWT components, automatically device-independent and will also be rendered. Issues such as sophisticated pagination or printing areas which have been scrolled out of view are simply left to be addressed by the dippable bean as part of its paint( ) method.

Referring again to step 204, if the bean being dipped lacks AWT as an ancestor class, the process proceeds to step 206, which depicts throwing an exception (DipRejectAdditionException) when the object being dipped is not a descendant of java.awt.Component. If a bean does not have java.awt.Component as an ancestor somewhere in its inheritance hierarchy, then the PrintDip of the present invention cannot be applied to the bean. However, all GUI-based beans—including applets or applications with their own frames and simple panel-based beans—are descendants of java.awt.Component. In any event, beans which do not provide some kind of a graphical user interface are unlikely to have anything meaningful to print. Such beans are most likely to simply be server-side daemons, which sit idle until a client connects with them, at which time the bean merely returns some sort of data.

If the object (bean) being dipped is determined to be a descendant of java.awt.Component, the process next passes to step 212, which illustrates invoking a createMethodCallListener method, which registers the print dip with the addNotify and removeNotify methods of the dipped bean. The Java Beans event model is a callback model: any component interested in a specific event within a subject component registers itself as a listener with the subject component and, when the event occurs, the subject component calls the listener back. From either of steps 206 or 212, the process passes to step 214, which illustrates the process becoming idle until another bean is dipped in the PrintDip.

Figure 4A:
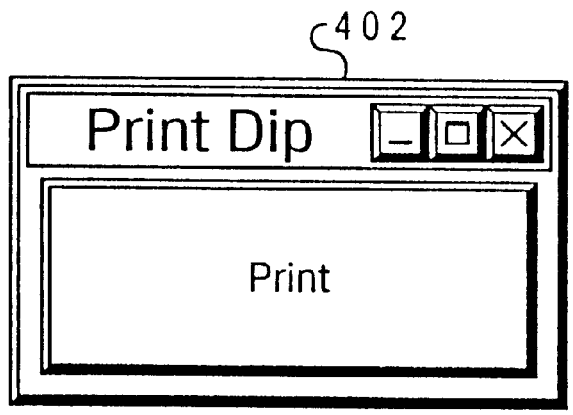
FIGS. 4A–4D are dialog boxes displayed while providing print support during execution of Java applet to which print support has been added in accordance with a preferred embodiment of the present invention.

Referring to FIGS. 4A–4D, dialog boxes displayed while providing print support during execution of Java applet to which print support has been added in accordance with a preferred embodiment of the present invention are illustrated. The dialog boxes depicted may be displayed when a dipped Java bean is executed in the Microsoft Windows NT 4.0 operating system. FIG. 4A depicts a floating frame for a print button 402 or other print control displayed when the dipped Java applet's addNotify method is called and the dip's showPrintButtonFrame property is true. Note that the floating dialog may be suppressed by setting the showPrintButtonFrame property to false; this would be desirable if the application assembler wishes to wire some other user interface element, such as a menu item or a toolbar icon, to the dip's printDippableBean method. When the addNotify notification is received from the dipped bean in the present invention, a createPrintButtonFrame method is called to display a separate, floating frame containing a "Print" button that may be used to initiate a print job, such as Print button 402. More detailed print palettes may also be displayed within the floating frame.

Figure 4B:
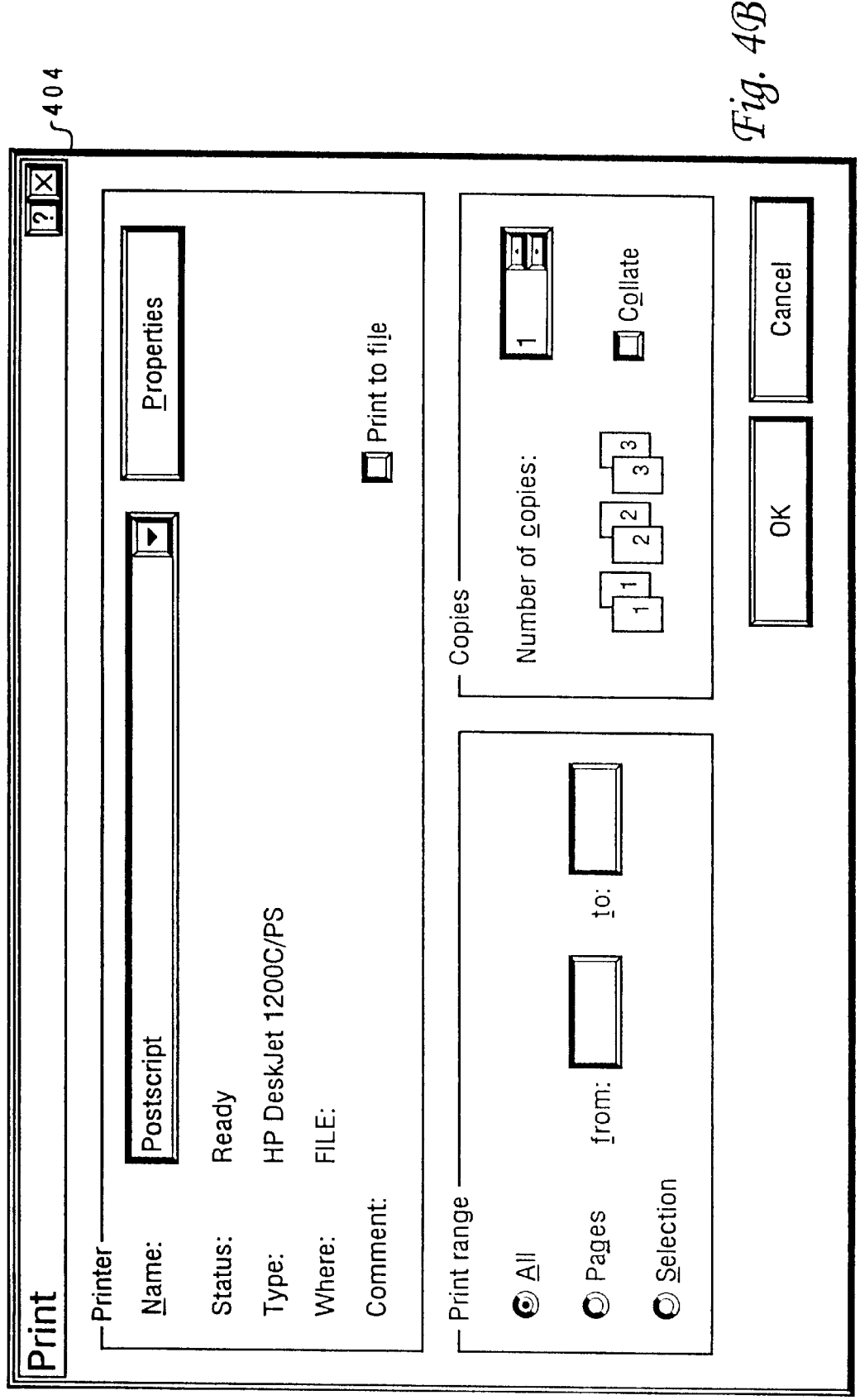

FIG. 4B portrays a standard print dialog for an operating system on which the dipped Java applet is currently executed, Windows NT 4.0 for the exemplary embodiment. The print dialog is displayed in response to actuation of the print control, such as print button 402, displayed with the user interface of a dipped applet. Dialog 404 may include indicators of the printing parameters, such as the printer selected, paper size and/or type, page orientation, resolution, the number of copies desired, etc. Dialog 404 may also include a control, the "Properties" box in the depicted example, allowing the user to initiate alteration of the print properties.

Figure 4C:
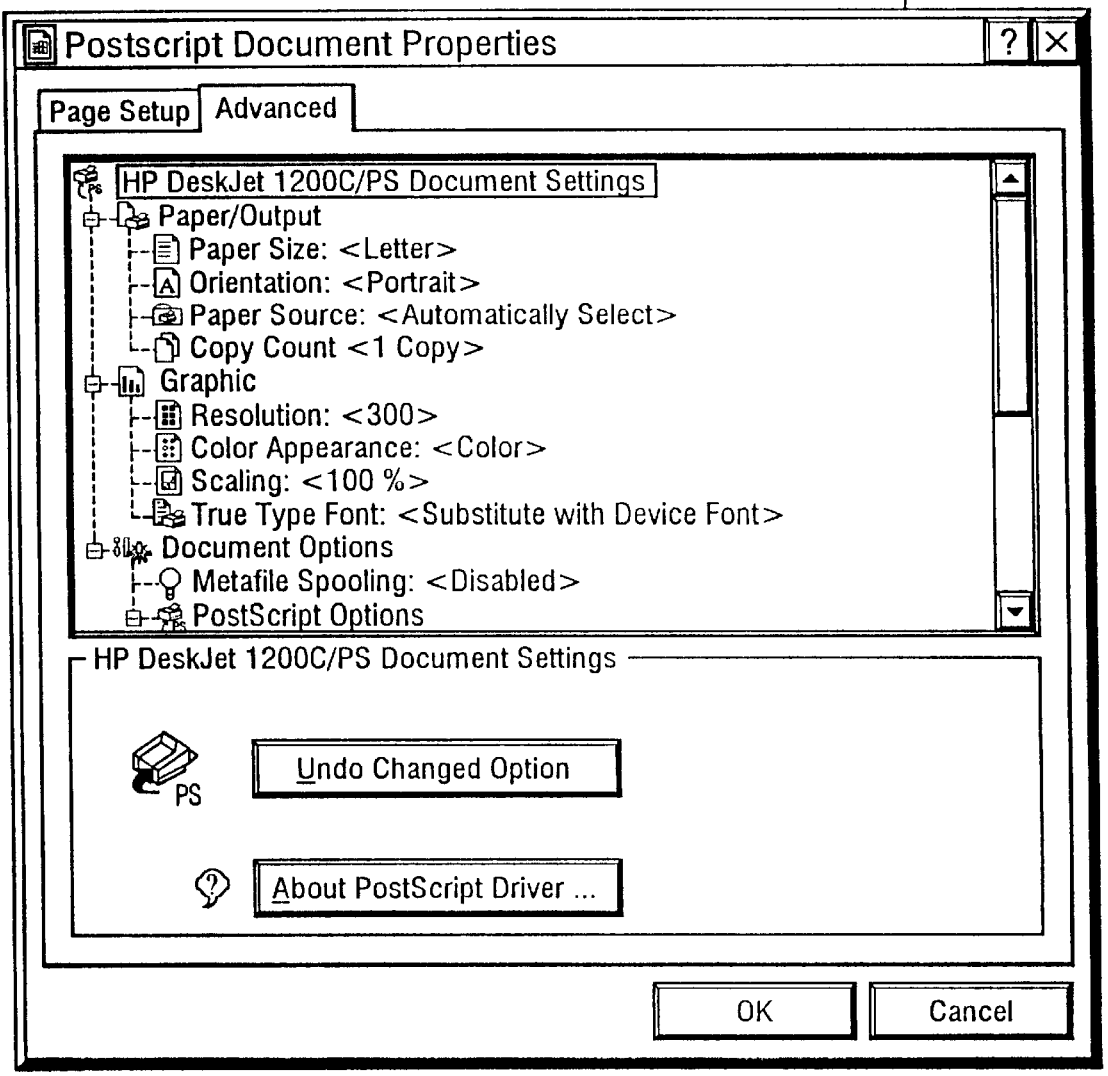

FIG. 4C portrays a standard print properties dialog box for an operating system on which the dipped Java applet is currently executed, which is again Windows NT 4.0 for the embodiment shown. Print properties dialog box 406 allows the user to modify selected properties of accessible printers such as paper size and source, print orientation, etc.

Figure 4D:
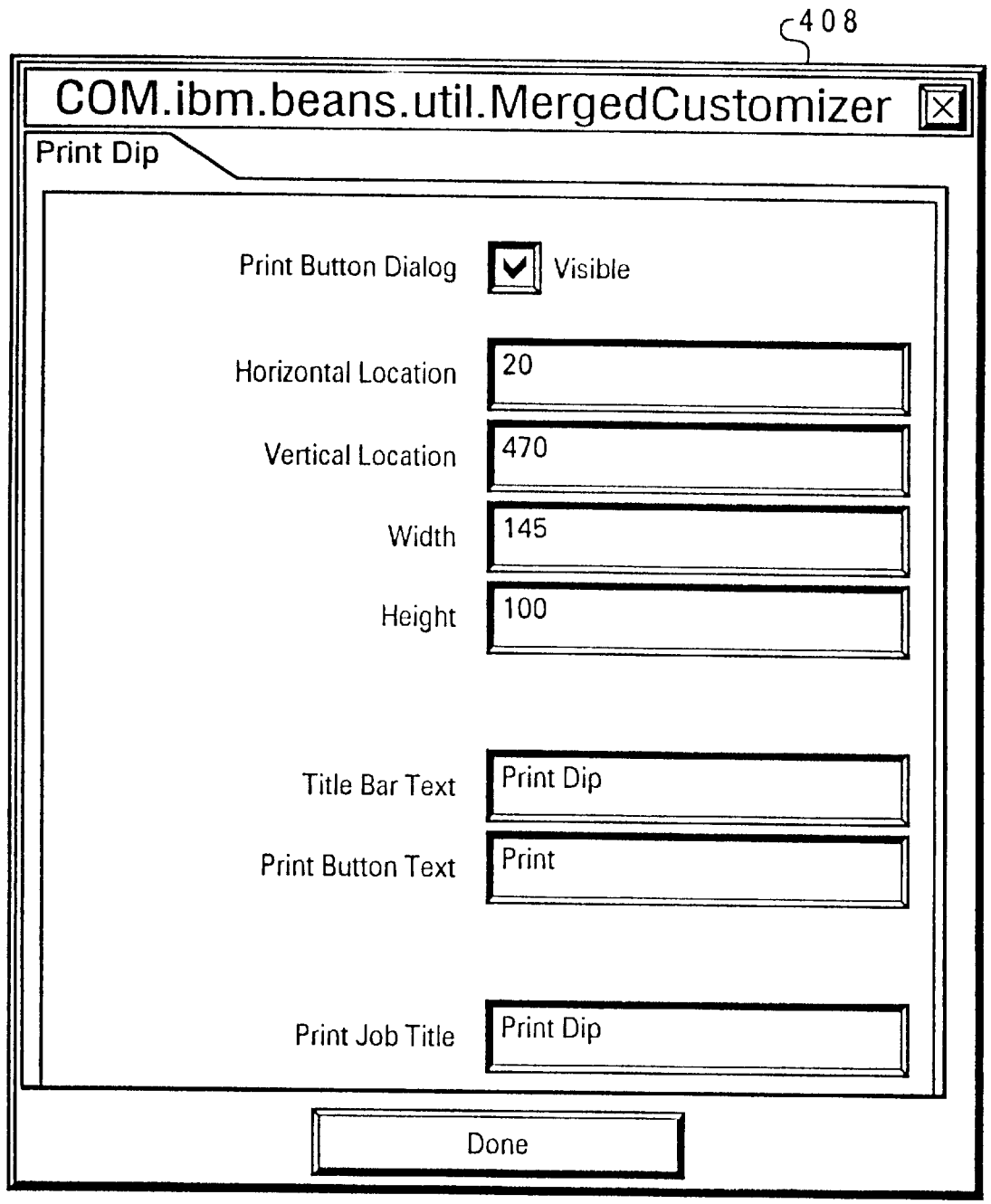

FIG. 4D illustrates a customizer dialog for a print dip. The customizer dialog box may be accessed, where supported, through a JavaBean-compliant application builder tool. Customizer dialog box 408 allows the user to set the print control to be visible or hidden, set the size or location of the print control, and customize the visual cues associated with the print control, such as the text in a title bar of the print control or on a print button within the print control.

Figure 5B:
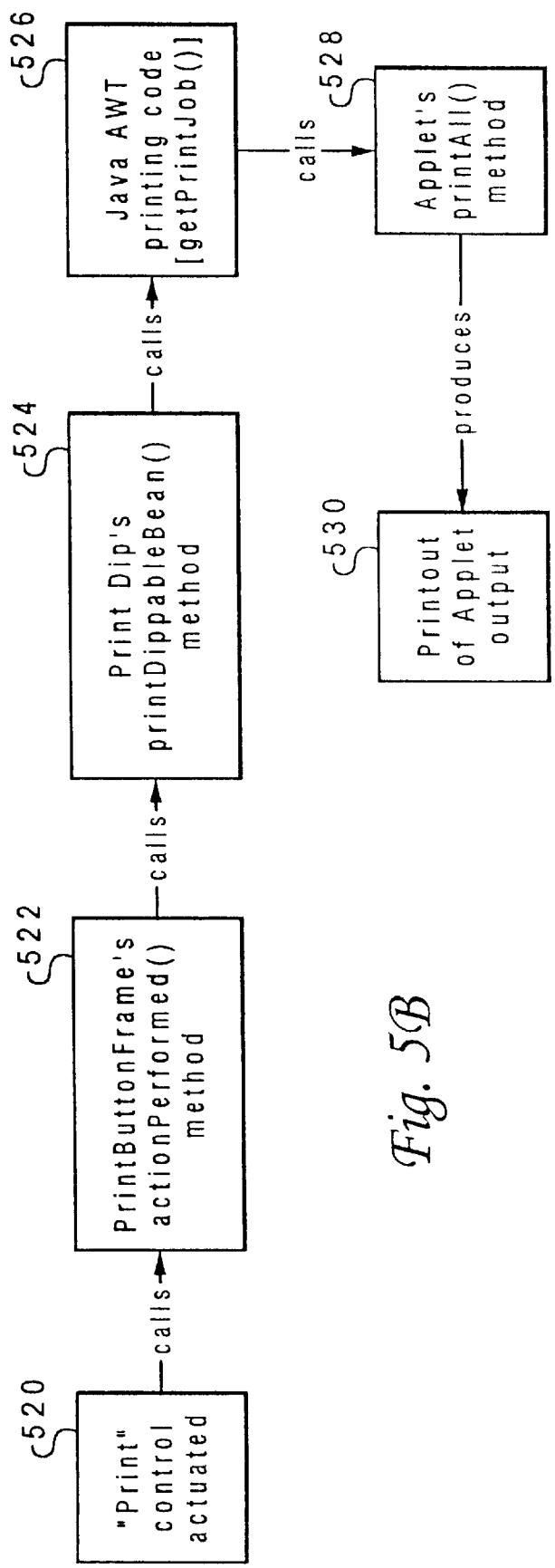
Figure 5C:
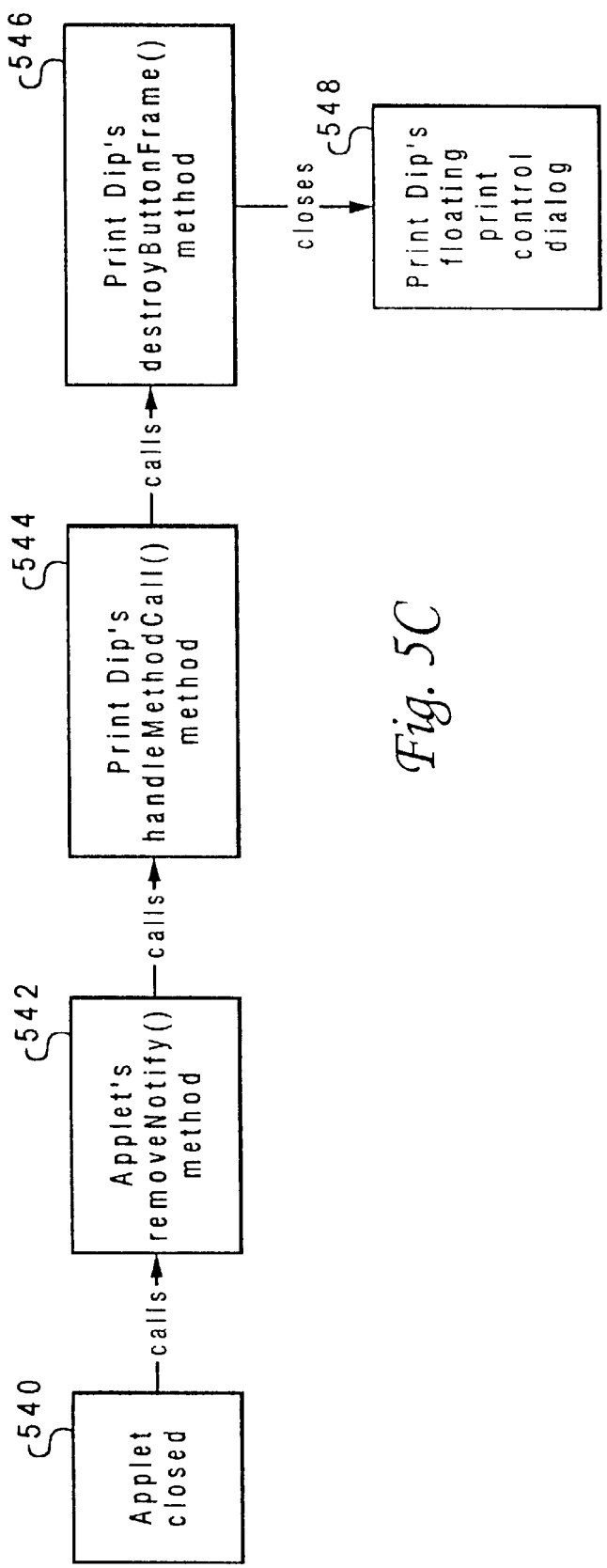

With reference now to FIGS. 5A–5C, block diagrams of code interactions occurring during execution of a dipped Java bean in accordance with a preferred embodiment of the present invention are depicted. FIG. 5A depicts the code interaction when the dipped applet is started. The applet is started (block 502) in a manner appropriate for the operating system on which the applet is to be run. During startup, the applet's addNotify( ) method is called (block 504), which in turn calls the print dip's handleMethodCall( ) method (block 506). The print dip's handleMethodCall( ) method calls the print dip's createPrintButtonFrame( ) method (block 508), which displays the print dip's floating print control dialog box (block 510) on the display of the system executing the applet.

FIG. 5B illustrates the code interactions when the print control is actuated by a user. Actuation of the print control (block 520), such as by clicking on a print button displayed within a PrintButtonFrame print control dialog box, calls the PrintButtonFrame's actionPerformed( ) method (block 522), which in turn calls the print dip's printDippableBean( ) method (block 524). The print dip's printDippableBean( )

method calls the Java AWT printing code, getPrintjob( ) (block 526), which calls the applet's printAll( ) method (block 528) to produce a printout of the applet's output.

FIG. 5C depicts the code interaction when the dipped applet is shut down. The applet is closed (block 540) in a manner appropriate for the operating system on which the applet is being run. During shut down, the applet's removeNotify( ) method is called (block 542), which in turn calls the print dip's handleMethodCall( ) method (block 544). The print dip's handleMethodCall() method calls the print dip's destroyButtonFrame( ) method (block 546), which closes the print dip's floating print control dialog box (block 548) on the display of the system executing the applet.

The present invention enables print support in preexisting software components which do not specifically address printing. This capability may be useful within an integrated development environment (IDE) for software developers, where print support may be quickly added after all other aspects of coding are complete. The present invention may also be provided to moderately sophisticated end users, who might find it useful to add print support to Java applications received from a vendor in customizing the application to their particular needs. The simplicity of the present invention allows any user capable of using the dialog-driven processes of the present invention to add print support to a preexisting application.

The present invention allows print support to be added by merely wiring in access to existing print support, which may not have been addressed when the application was originally built. When implemented as a Java component, the present invention also enjoys the platform-independence which accompanies Java applications.

It is important to note that while the present invention has been described in the context of a fully functional data processing system or network of data processing systems, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of enabling print support for a software component, comprising:

determining whether a subject component is a member of a supported class for which print support is provided by an application environment; and responsive to determining that the subject component is a member of the supported class, registering a component for providing a print dialog with the subject component's notification methods.

2. The method of claim 1, wherein the step of determining whether the subject component is a member of a supported class further comprises:

determining whether the subject component is a member of a class supporting a graphical user interface to the subject component.

3. The method of claim 1, wherein the step of determining whether the subject component is a member of a supported class further comprises:

determining whether the subject component is a descendent of an abstract windowing toolkit component.

4. The method of claim 1, further comprising:

instantiating a print dip component providing a print dialog.

5. The method of claim 1, wherein the step of registering a component for providing a print dialog further comprises:

determining whether the subject component is capable of keeping track of a dip component.

6. The method of claim 5, further comprising:

responsive to determining that the subject component is not capable of keeping track of a dip component, introspecting the subject component to determine the subject components properties, events, and methods; and instantiating a subclass component which is a descendent of the subject component, the subclass component including the properties, events, and methods of the subject component and code for keeping track of a dip component.

7. The method of claim 6, further comprising:

registering the component for providing the print dialog with the subclass component's notification methods.

8. The method of claim 1, wherein the step of registering a component for providing a print dialog further comprises:

registering a print dip component with the subject component's addNotify and removeNotify methods.

9. A data processing system providing print support to a software component, comprising:

a data processing system;

a subject component within a memory in the data processing system, wherein the subject component is a member of a supported class for which print support is provided by an application environment and is capable of keeping track of a dip component; and a print dip component within the memory and registered with the notification method of the subject component, the print dip component providing a print dialog for actuating the print support of the application environment.

10. The data processing system of claim 9, wherein the subject class is a subclass of an undippable component which cannot keep track of a dip component, the subject class having the methods, properties and events of the undippable class and code for keeping track of a dip component.

11. The data processing system of claim 9, wherein the subject component is a member of a class of components having support for graphical user interfaces to the components.

12. The data processing system of claim 9, wherein the subject component is a descendant of a java.awt.Component class component.

13. A computer program product in a computer readable medium of instructions, comprising:

instructions within the computer usable medium for determining whether a subject component is a member of a supported class for which print support is provided by an application environment; and instructions within the computer usable medium, responsive to determining that the subject component is a member of the supported class, for registering a component for providing a print dialog with the subject component's notification methods.

14. The computer program product of claim 13, wherein the instructions for determining whether the subject component is a member of a supported class further comprise:
instructions for determining whether the subject component is a member of a class supporting a graphical user interface to the subject component.

15. The computer program product of claim 13, wherein the instructions for determining whether the subject component is a member of a supported class further comprise:
instructions for determining whether the subject component is a descendent of an abstract windowing toolkit component.

16. The computer program product of claim 13, further comprising:
instructions within the computer usable medium for instantiating a print dip component providing a print dialog.

17. The computer program product of claim 13, wherein the instructions for registering a component for providing a print dialog further comprise:
instructions for determining whether the subject component is capable of keeping track of a dip component.

18. The computer program product of claim 17, further comprising:
instructions within the computer usable medium, responsive to determining that the subject component is not capable of keeping track of a dip component, for introspecting the subject component to determine the subject components properties, events, and methods; and
instructions within the computer usable medium for instantiating a subclass component which is a descendent of the subject component, the subclass component including the properties, events, and methods of the subject component and code for keeping track of a dip component.

19. The computer program product of claim 18, further comprising:
instructions within the computer usable medium for registering the component for providing the print dialog with the subclass component's notification methods.

20. The computer program product of claim 13, wherein the instructions for registering a component for providing a print dialog further comprise:
instructions for registering a print dip component with the subject component's addNotify and removeNotify methods.

* * * * *